(12) United States Patent
Suman

(10) Patent No.: US 9,754,144 B1
(45) Date of Patent: Sep. 5, 2017

(54) ILLUMINATION SYSTEM FOR SCANNER

(71) Applicant: DATALOGIC IP TECH S.R.L., Lippo di Calderara di Reno (IT)

(72) Inventor: Michele Suman, Ponte San Nicolo (IT)

(73) Assignee: Datalogic IP Tech S.r.l., Lippo di Calderara di Reno (IT)

( * ) Notice: Subject to any disclaimer, the term of this patent is extended or adjusted under 35 U.S.C. 154(b) by 0 days.

(21) Appl. No.: 15/148,507

(22) Filed: May 6, 2016

(51) Int. Cl.
*G06K 7/14* (2006.01)
*G06K 7/10* (2006.01)

(52) U.S. Cl.
CPC ....... *G06K 7/10564* (2013.01); *G06K 7/1413* (2013.01); *G06K 2007/10524* (2013.01)

(58) Field of Classification Search
USPC ................................ 235/454, 462.01–462.49
See application file for complete search history.

(56) References Cited

U.S. PATENT DOCUMENTS

2005/0170332 A1* 8/2005 Shimamoto ........ G01N 21/6452
435/4

\* cited by examiner

*Primary Examiner* — Jamara Franklin
(74) *Attorney, Agent, or Firm* — Shook, Hardy & Bacon L.L.P.

(57) ABSTRACT

A scanner configured to provide different patterns of light for scanning is provided. The scanner may include electrochromic surfaces and reflective surfaces, which can be arranged and used to direct light through different pathways within the scanner. The scanner may further include one or more light emitting components, receiving optics, and power supplies to facilitate generating the different patterns of light for scanning. A method of scanning is also provided.

20 Claims, 12 Drawing Sheets

ILLUMINATION SYSTEM FOR SCANNER

TECHNICAL FIELD

The field relates to scanners and illumination technology for the same.

BACKGROUND

A scanner may include components that provide illumination of scanned surfaces. Different types of illuminations are sometimes required for different scanning needs, and as a result, a scanner that is configured to provide a variety of illuminations, and accordingly provide greater versatility in scanning, among other benefits, is needed.

SUMMARY

This summary is provided to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

In brief, and at a high level, this disclosure describes, among other things, a scanner configured to emit different patterns of light during scanning. The scanner may include electrochromic surfaces and reflective surfaces arranged and used to reflect or emit light through different pathways within the scanner, to provide different patterns of light for reading scannable media (e.g., barcodes).

In a first embodiment of the technology, a scanner is provided. The scanner comprises a receiving optic, a light emitting component configured to selectively emit light, and a first electrochromic surface. The light emitting component is oriented such that the light emitted from the light emitting component is at least partially directed towards the first electrochromic surface. The scanner further comprises a power supply coupled to the first electrochromic surface.

In a second embodiment of the technology, a scanner configured to provide variable illumination is provided. The scanner comprises a housing, the housing comprising at least partially therein a receiving optic, a plurality of light emitting components configured to selectively emit light, a first plurality of electrochromic surfaces, each electrochromic surface of the first plurality of electrochromic surfaces oriented to receive at least a portion of the light from a respective light emitting component of the plurality of light emitting components, and at least one power supply coupled to the plurality of light emitting components and to the first plurality of electrochromic surfaces.

In a third embodiment of the technology, a method of scanning is provided. The method comprises providing a scanner comprising at least a receiving optic, a light emitting component configured to selectively emit light, and a first electrochromic surface, the at least one light emitting component oriented such that the light emitted from the light emitting component is at least partially directed towards the first electrochromic surface, and a power supply coupled to the first electrochromic surface and configured to selectively provide a first voltage to the first electrochromic surface. The method further comprises providing the first voltage to the first electrochromic surface to provide reflectivity from the first electrochromic surface, and, while the first voltage is applied, emitting the light from the light emitting component, and reflecting the light off of at least the first electrochromic surface to generate a first light pattern for scanning.

BRIEF DESCRIPTION OF THE DRAWINGS

The present technology is described in detail below with reference to the attached drawing figures, which are intended to be exemplary and non-limiting in nature, wherein.

DETAILED DESCRIPTION

Figure 1:
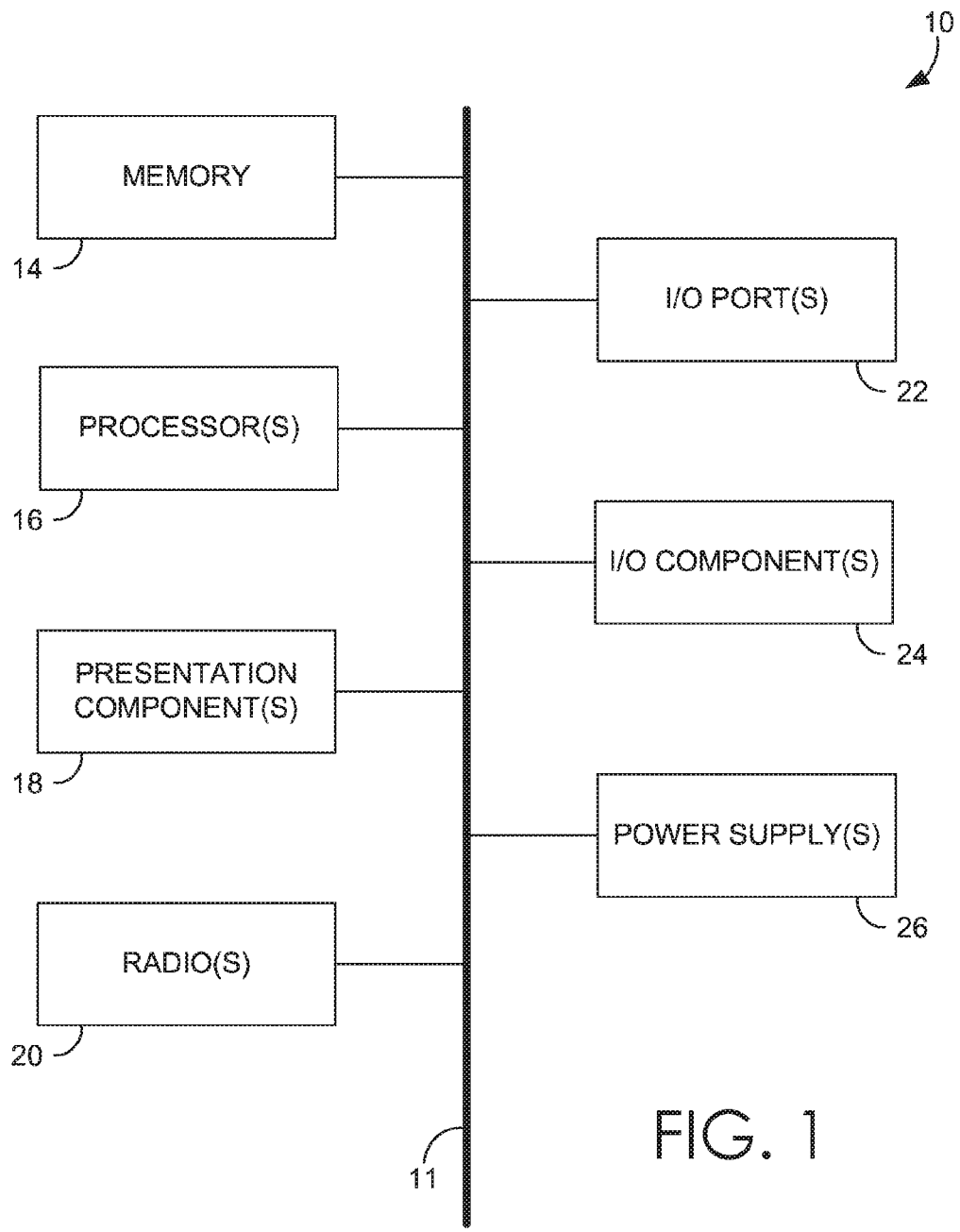
FIG. 1 depicts an exemplary computing system for a scanner, in accordance with an embodiment of the present technology.

The subject matter of the present technology is described with specificity herein to meet statutory requirements. However, the description itself is not intended to limit the scope of the technology. Rather, the claimed subject matter may be embodied in other ways, to include different elements, steps, and/or combinations of elements or steps, similar to the ones described in this disclosure, and in conjunction with other present or future technologies. Moreover, although the terms "step" and "block" may be used herein to connote different elements of various methods employed, the terms should not be interpreted as implying any particular order among or between various steps or blocks unless and except when the order of individual steps or blocks is explicitly described and required.

At a high level, the present technology relates generally to a scanner configured to provide different patterns of light for scanning. More specifically, an exemplary scanner may comprise at least one light emitting component, one or more electrochromic surfaces that comprise two-state elements providing reflective/transmitting status or absorbent/transmitting status based upon application, change, or reduction of a voltage, one or more reflective surfaces, and/or one or more transmitting surfaces, for example, that allow directing of light through different pathways within the scanner to produce the different patterns of light for scanning. Exemplary embodiments of the technology are described in greater detail below with reference to FIGS. 1-13.

Embodiments of the technology may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of scanning components, may be built into a scanner, and/or may be integrated into a scanning system including one or more computing or processing components.

Computer-readable media includes both volatile and nonvolatile media, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Electrochromic surfaces are surfaces with adjustable optical properties. Accordingly, as used in this disclosure, there are two types of "electrochromic surfaces." A first type is a surface configured to at least provide either a light-reflective state upon application of an opportune voltage status to the electrochromic surface, or a light-transmitting state upon a change in the opportune voltage status applied to the electrochromic surface (e.g., a reduction in voltage). Accordingly, in the light-reflective state, light directed at the electrochromic surface is primarily, substantially, or completely reflected from the electrochromic surface, and in the light-transmitting state, light directed at the electrochromic surface is primarily, substantially, or completely transmitted through the electrochromic surface.

A second type is a surface configured to at least provide either a light-absorbing state upon application of an opportune voltage status to the electrochromic surface, or a light-transmitting state upon a change in the opportune voltage status applied to the electrochromic surface (e.g., a reduction in voltage). Accordingly, in the light-absorbing state, light directed at the electrochromic surface is primarily, substantially, or completely absorbed by the electrochromic surface, and in the light-transmitting state, light directed at the electrochromic surface is primarily, substantially, or completely transmitted through the electrochromic surface. This multi-functionality allows for multiple pathways of light within a single scanner, as will be described in greater detail with respect to FIGS. 3-10.

Referring to FIG. 1, a block diagram of an exemplary computing device 10 for use with a scanner is provided, in accordance with an embodiment of the present technology. It should be noted that although some components in FIG. 1 are shown in the singular, they may be plural. For example, the computing device 10 might include multiple processors or multiple radios. As shown in FIG. 1, computing device 10 includes a bus 11 that directly or indirectly couples various components together, including memory 14, processor(s) 16, presentation component(s) 18 (if applicable), radio(s) 20, input/output (I/O) port(s) 22, input/output (I/O) component(s) 24, and a power supply 26.

Memory 14 may take the form of memory components described herein. Thus, further elaboration will not be provided here, but it should be noted that the memory 14 may include any type of tangible medium that is capable of storing information, such as a database. A database may be any collection of records, data, and/or information. In one embodiment, memory 14 may include a set of embodied computer-executable instructions that, when executed, facilitate various functions or elements disclosed herein. These embodied instructions will variously be referred to as "instructions" or an "application" for short. Processor 16 may actually be multiple processors that receive instructions and process them accordingly. Presentation component 18 may include a display, a speaker, and/or other components that may present information (e.g., a display, a screen, a lamp (LED), a graphical user interface (GUI), and/or even lighted keyboards) through visual, auditory, and/or tactile cues.

The radio 20 may facilitate communication with a network, and may additionally or alternatively facilitate other types of wireless communications, such as Wi-Fi, WiMAX, LTE, and/or other VoIP communications. In various embodiments, the radio 20 may be configured to support multiple technologies, and/or multiple radios may be configured and utilized to support multiple technologies.

The input/output (I/O) ports 22 may take a variety of forms. Exemplary I/O ports may include a USB jack, a stereo jack, an infrared port, a firewire port, other proprietary communications ports, and the like. Input/output (I/O) components 24 may comprise keyboards, microphones, speakers, touchscreens, and/or any other item usable to directly or indirectly input data into the computing device 10.

Power supply 26 may include batteries, fuel cells, or any other component that may act as a power source to supply power to the computing device 10 or to other scanning components, including through one or more electrical connections or couplings. The power supply 26 may be configured to selectively supply power to different components independently and/or concurrently.

Figure 2:
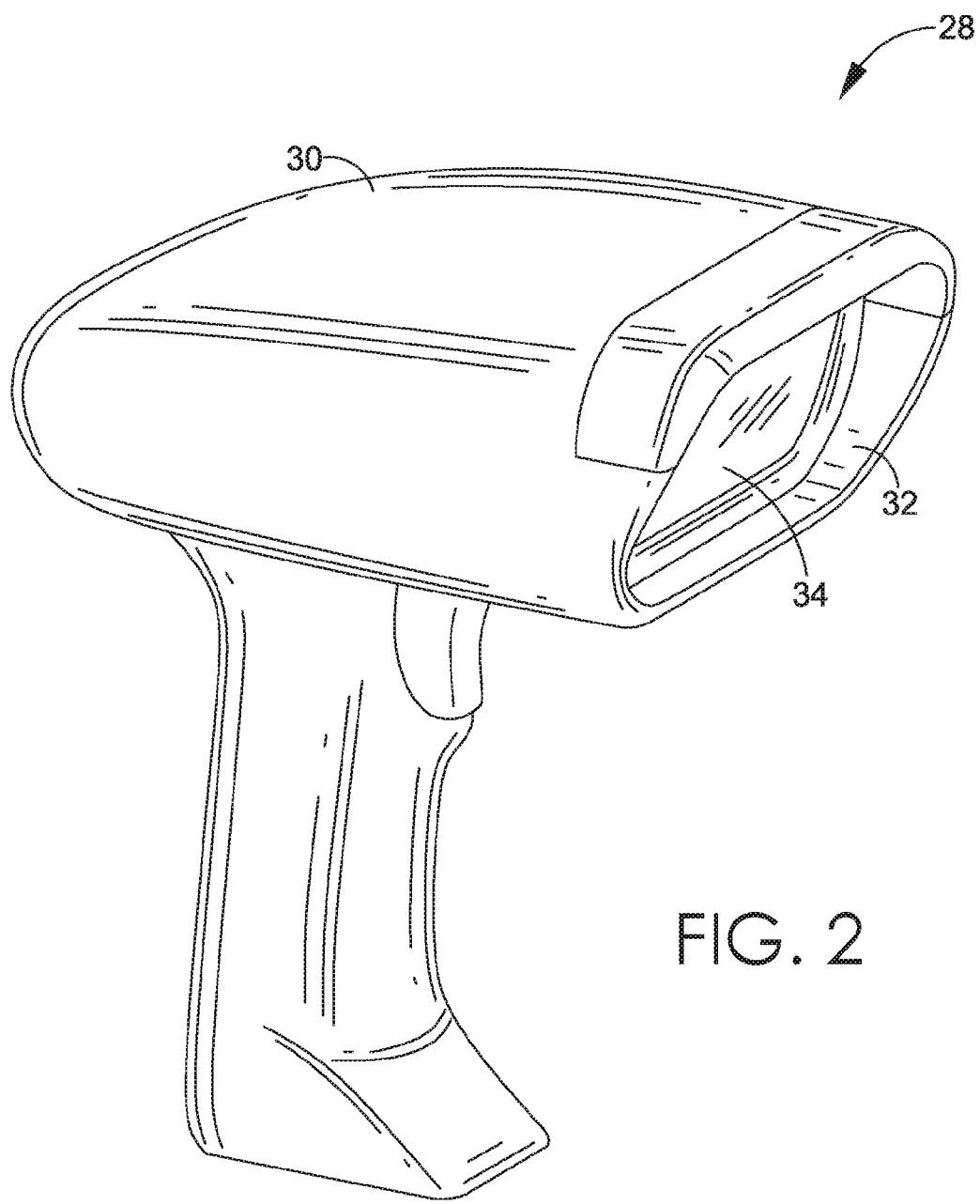
FIG. 2 depicts an exemplary scanner that includes a variable illumination system, in accordance with an embodiment of the present technology.

Referring to FIG. 2, an exemplary scanner 28 which may be configured to provide different patterns of light for scanning is provided, in accordance with an embodiment of the present technology. The scanner 28 shown in FIG. 2 includes a housing 30 and an opening 32. The opening 32 may include one or more optics 34 (e.g., lens, filter, screen, prismatic surface, etc.) through which light may be emitted from various light emitting components (e.g., LED, bulb, laser, etc.) enclosed within the scanner. It should be noted that size, shape, type, design, and configuration of the scanner 28 shown in FIG. 2 is merely exemplary. Different scanners, including those having different components or arrangements of components therein, are possible and contemplated. As an example, a fixed scanner is contemplated, as well as a robotically or manually operated scanner, as well as those having a single opening or multiple openings.

With reference to FIGS. 3-10, several exemplary illumination systems 36, 76 for use with a scanner are provided. More specifically, the systems 36, 76 shown in FIGS. 3-10 are configured to direct light through different pathways within a scanner to provide different patterns of emitted light for scanning. However, it should be understood that other components, and/or other arrangements of components, in addition to the ones shown in FIGS. 3-10, may be used or included. As one example, the systems 36, 76, when incorporated into a scanner, may further comprise one or more power connectors, power cables, insulation, support structures, additional reflective pathways, and the like. The systems 36, 76 shown in FIGS. 3-10 are merely exemplary, and are presented in a simplified form for clarity and understanding purposes.

Figure 3:
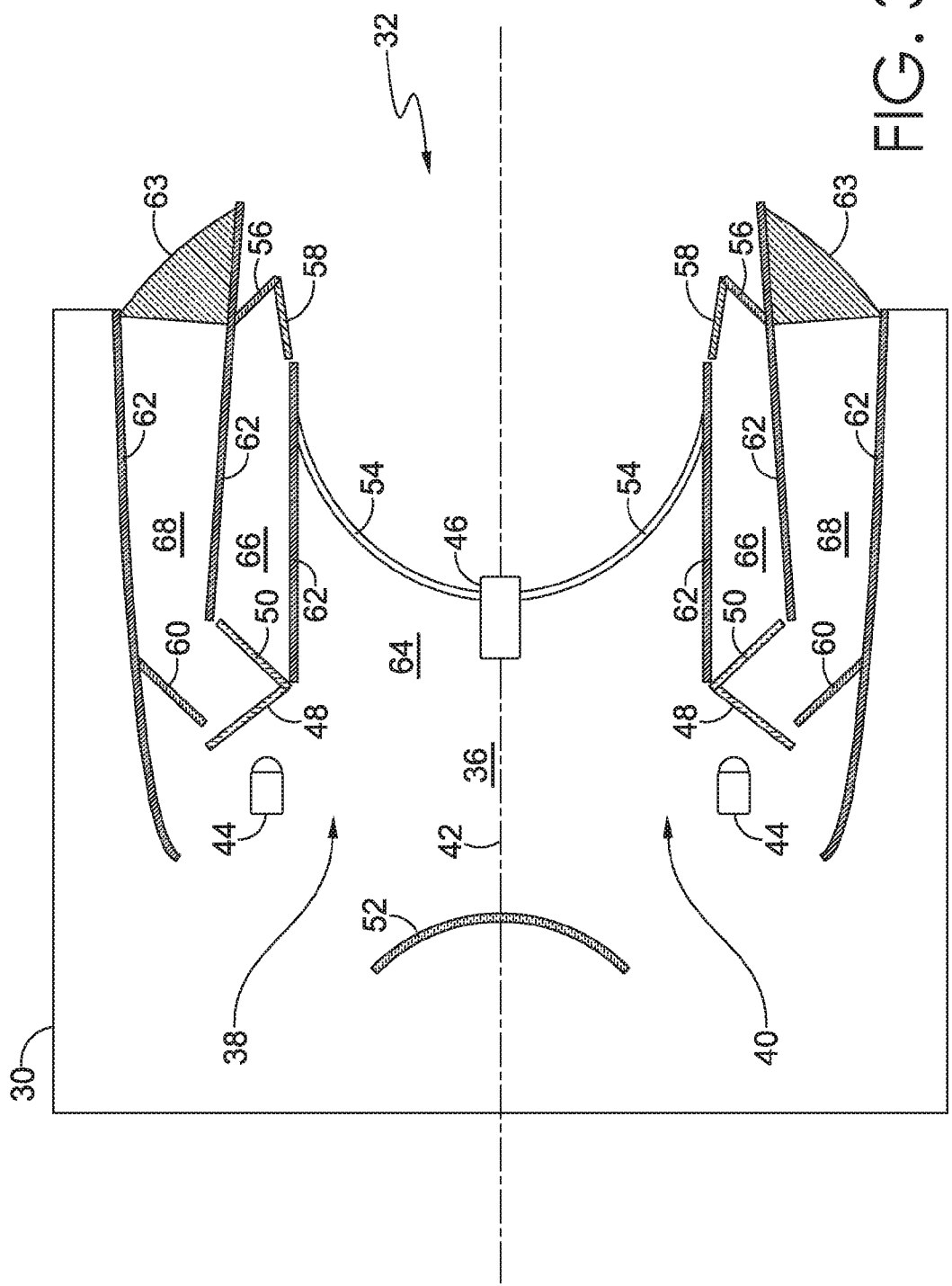
FIG. 3 depicts a partial cross-section view of a first exemplary illumination system for a scanner, in accordance with an embodiment of the present technology.

Referring to FIG. 3, a first exemplary illumination system 36 for a scanner, such as the scanner 28, is provided, in accordance with an embodiment of the present technology. The illumination system 36 may be located at least partially within a scanner housing 30, and comprises a first light-generating configuration 38 and a second light-generating configuration 40. The first and second light-generating configurations 38, 40 are positioned symmetrically about a center axis 42 of the housing 30, and are at least partially enclosed within the housing 30. It should be noted that more than two light-generating configurations positioned about the center axis 42 of the housing 30 are possible and contemplated.

Each of the light-generating configurations 38, 40 includes at least one light emitting component 44 (e.g., one or more LEDs, bulbs, lasers, diodes, etc.), and each light emitting component 44 is coupled to at least one power supply (not shown in FIG. 3) through one or more electrical connections to receive power. A receiving optic 46 (e.g., camera, sensor, etc.) is positioned along the center axis 42 of the housing 30 and oriented towards the opening 32 of the housing 30 to collect light reflected from a scanned surface. The receiving optic 46 may also be communicatively coupled to one or more computer and/or processor components that may identify, process, and/or record a scanned media.

Each of the light-generating configurations 38, 40 further comprises a first electrochromic surface 48 and a second electrochromic surface 50 oriented along a path of light emitted from the respective light emitting components 44. In other words, when light is emitted from the light emitting components 44, the light is at least partially directed towards the first and second electrochromic surfaces 48, 50 associated with the respective light emitting components 44. Furthermore, a first reflective surface 52 is positioned within the housing 30 and is oriented to reflect the light from the first electrochromic surfaces 48 towards the opening 32 of the housing 30.

The system 36 further includes a first optic 54 (e.g., filter, prism, screen, lens, etc.) that is located between the first reflective surface 52 and the opening 32. Accordingly, when light is reflected from the first reflective surface 52 towards the opening 32 of the housing 30, the light passes at least partially through the first optic 54, so it can diffuse, distribute, and/or adjust the light for emission during scanning. Each of the light-generating configurations 38, 40 further includes a second reflective surface 56 oriented along the path of the light emitted from the respective light emitting components 44. The second reflective surface 56 is oriented to reflect the light through a second optic 58 (a filter, prism, screen, lens, or transparent window, etc.) out of the housing 30 for scanning.

Further provided in each of the light-generating configurations 38, 40 is a third reflective surface 60. The third reflective surface 60 is oriented so that when light is emitted from the light emitting components 44, and the light is reflected from the second electrochromic surfaces 50, the light is then reflected off the third reflective surface 60 towards a refractive optic 63 (e.g., a filter, prism, screen, lens, window, and/or other refractive surface) prior to exiting the housing 30. In addition to the elements described, the illumination system 36 further comprises one or more walls 62, which may be darkened, opaque, reflective, and/or non-transmitting, to isolate or separate first, second, and third pathways 64, 66, 68 of light within the housing 30. In this respect, the walls 62 may help to prevent interference of the light between the different pathways 64, 66, 68.

Figure 4:
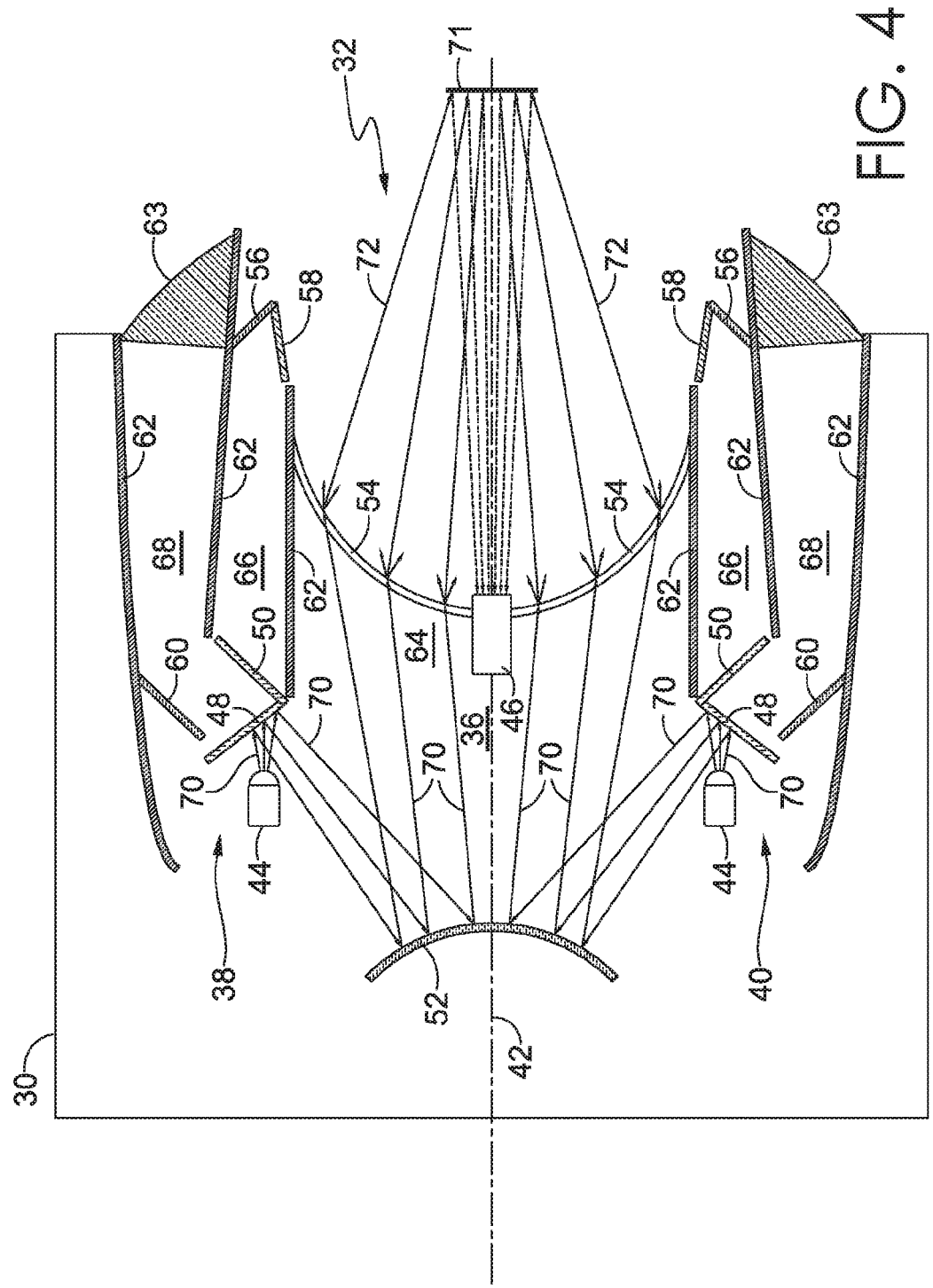
FIG. 4 depicts the system of FIG. 3 emitting a diffuse light pattern, in accordance with an embodiment of the present technology.

Referring to FIG. 4, the system 36 of FIG. 3 is shown emitting a diffuse light pattern, in accordance with an embodiment of the present technology. Certain scanned surfaces and scannable media may be more easily read and processed with a diffuse light pattern, due to the more direct, or perpendicular, application of the emitted light to a scanned surface 71. To generate the diffuse pattern with the illumination system 36, light 70 is emitted from the light emitting components 44 while a first voltage is applied to the first electrochromic surface 48, so that the first electrochromic surface 48 is primarily reflective. The light 70 is then reflected from the first electrochromic surfaces 48, and subsequently reflected from the first reflective surface 52 towards the first optic 54. The first optic 54 produces diffuse light 72, which is emitted from the opening 32 of the housing 30 to form the diffuse light pattern for scanning. The diffuse light 72 from the first optic 54 is at least partially reflected from the scanned surface 71 back towards the receiving optic 46, where it is collected.

Figure 5:
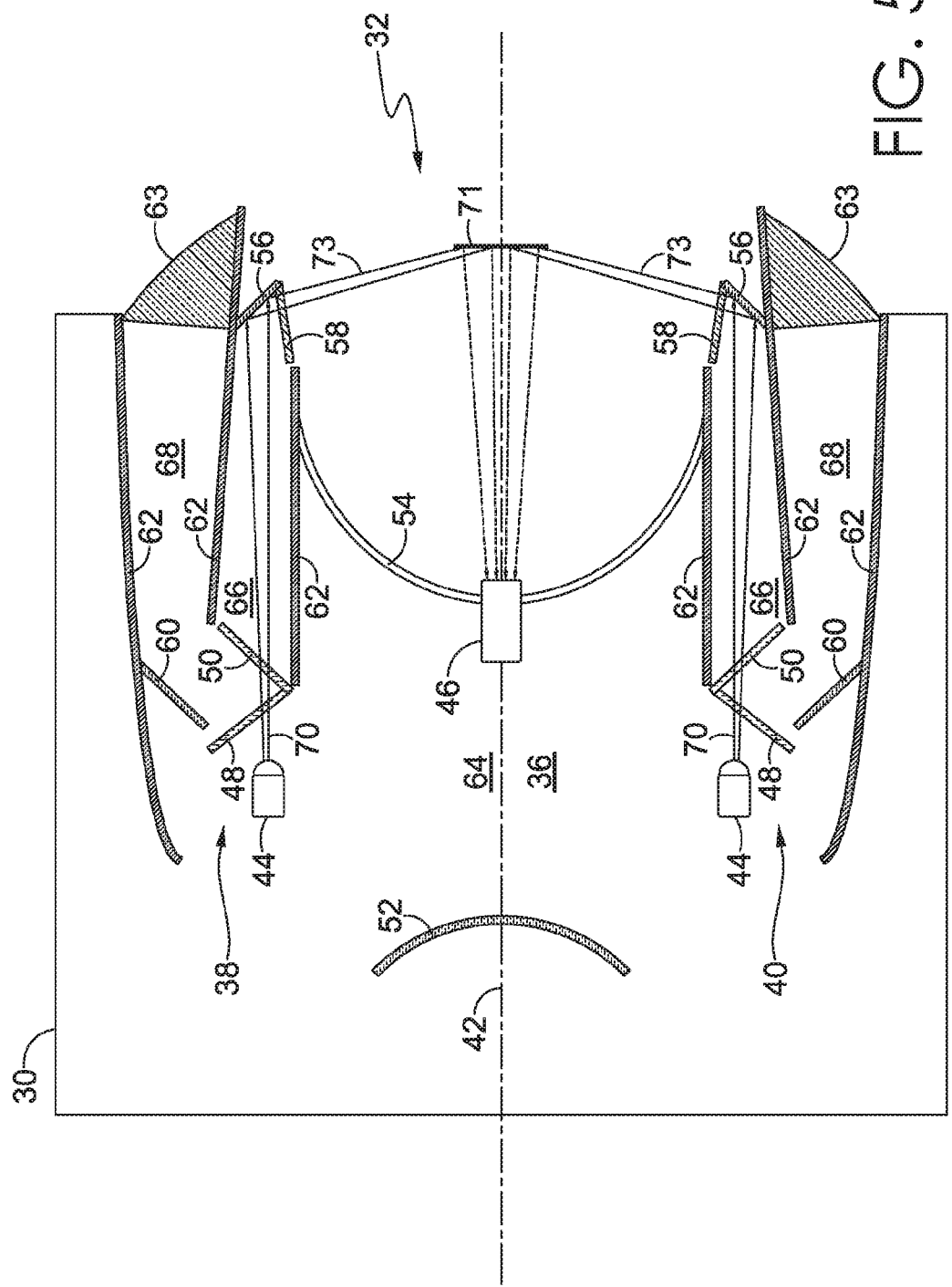
FIG. 5 depicts the system of FIG. 3 emitting a grazing light pattern, in accordance with an embodiment of the present technology.

Referring to FIG. 5, the system 36 of FIG. 3 is shown emitting a grazing light pattern, in accordance with an embodiment of the present technology. Certain scanned surfaces and scannable media may be more easily read and processed with a grazing light pattern, due to the more oblique and non-perpendicular angle of emitted light relative to the scanned surface 71. To generate the grazing light pattern with the system 36, light 70 is emitted from the light emitting components 44 towards the first and second electrochromic surfaces 48, 50. The second electrochromic surfaces 50 may function similarly as the first electrochromic surfaces 48, being reflective upon application of a second voltage. At the same time as the light 70 is emitted, the first voltage is reduced or changed to the first electrochromic surfaces 48, so that the first electrochromic surfaces 48 are primarily transmitting, allowing the light 70 to pass through them, and the second voltage is simultaneously reduced or changed to the second electrochromic surfaces 50, so that the second electrochromic surfaces 50 are primarily transmitting, allowing the light 70 to pass through them. Subsequently, the light 70 is reflected off of the second reflective surface 56 and through the second optic 58 to produce grazing light 73. The grazing light 73 is reflected from the scanned surface 71 towards the receiving optic 46, where it is collected.

Figure 6:
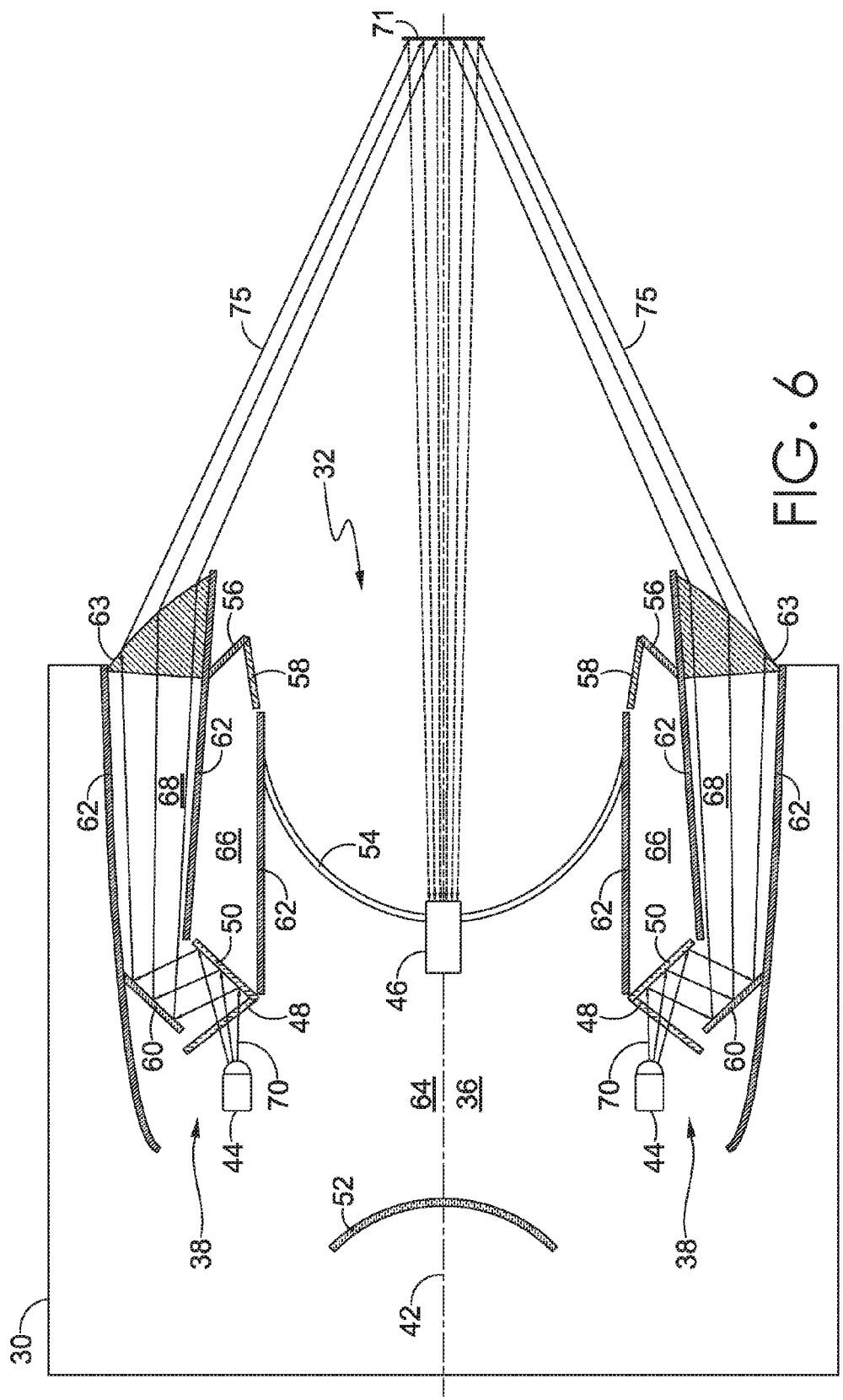
FIG. 6 depicts the system of FIG. 3 emitting a bright light pattern, in accordance with an embodiment of the present technology.

Referring to FIG. 6, the system 36 of FIG. 3 is shown emitting a bright light pattern, in accordance with an embodiment of the present technology. Certain scanned surfaces and scannable media may be more easily processed with a bright light pattern due to the resulting angle of emitted light. To generate a bright light pattern, light 70 is emitted from the light emitting components 44 towards the first and second electrochromic surfaces 48, 50. At the same time, a first voltage is reduced or changed to the first electrochromic surfaces 48 so that the first electrochromic surfaces 48 are primarily transmitting, and a second voltage is applied to the second electrochromic surfaces 50 so that the second electrochromic surfaces 50 are primarily reflective. Thus, the light 70 is transmitted through the first electrochromic surfaces 48 and reflected from the second electrochromic surfaces 50 towards the third reflective surfaces 60, where the light 70 is reflected towards the refractive optic 63. The light 70 is then transmitted through the refractive optic 63 and out of the opening 32 of the housing 30, producing bright light 75. The emitted bright light 75 is reflected off of the scanned surface 71 back towards the receiving optic 46, where it is collected.

The diffuse, grazing, and bright light patterns may further be thought of as light produced from first, second, and third pathways 64, 66, 68 within the housing 30. As a result, light may be emitted from the housing 30 at different radial distances from the center axis 42, and at different angles relative to the center axis 42, as shown in FIGS. 3-6. It should be noted that in various embodiments, the emitted light may be produced from any combination of electrochromic surfaces, reflective surfaces, transmitting surfaces, and/or other optical components arranged within a scanner.

The different patterns of light may be selected based on surface characteristics of the scanned surface 71. For example, diffuse light may be used for a scanned surface that is mirrored or otherwise reflective. Grazing light may be used for a scanned surface comprising engraved scannable media (e.g., engraved in plastic or metal). Bright light may be used for scanned surfaces having scannable media formed over a plastic or metal face. These are merely exemplary. The different patterns may therefore allow a more targeted angle of emitted light for proper reflection from the scanned surface.

Figure 7:
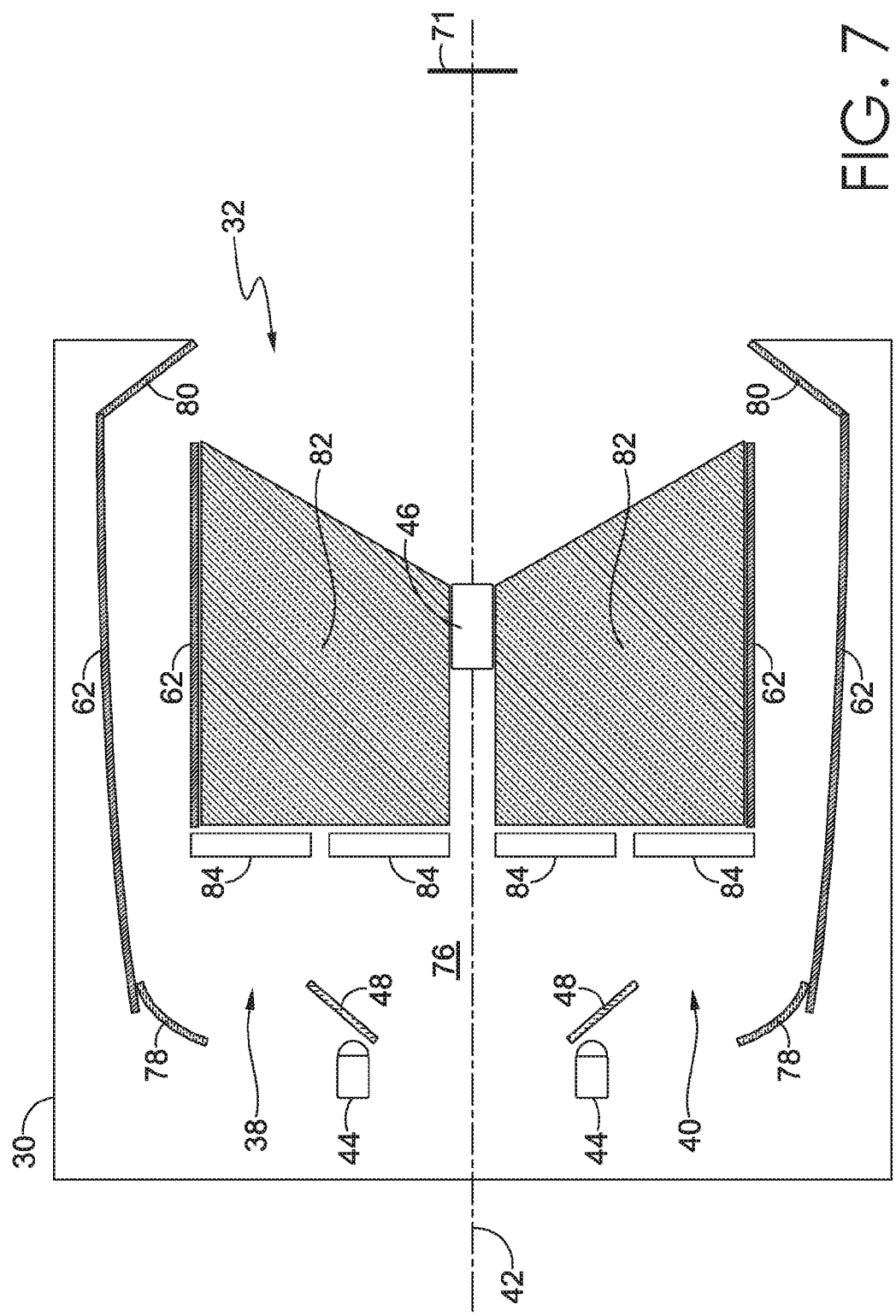
FIG. 7 depicts a partial cross-section view of a second exemplary illumination system for a scanner, in accordance with an embodiment of the present technology.

Referring to FIG. 7, a partial cross-sectional view of a second exemplary illumination system 76 for a scanner, such as the scanner 28, is provided, in accordance with an embodiment of the present technology. As shown in FIG. 7, the system 76 is at least partially enclosed with the housing 30, with the opening 32 oriented towards a scanned surface 71. Once again, as discussed with respect to the system 36 shown in FIGS. 3-6, the system 76 shown in FIG. 7 is depicted in a simplified format with only a selection of components for clarity, and additional components, such as power cables, walls, insulation, and/or additional reflective or transmitting surfaces, may be included as well.

The system 76 includes a first light-generating configuration 38, a second light-generating configuration 40, and a receiving optic 46. Each light-generating configuration 38, 40 comprises a light emitting component 44 oriented towards a first electrochromic surface 48. The light emitting components 44 and the first electrochromic surfaces 48 may be electrically coupled to at least one power supply (not shown in FIG. 7) configured to provide power. As with the system 36, the at least one power supply may be enclosed at least partially within or outside of the housing 30 (e.g., may be a local or remote power source). Additionally, the power supply may be configured to provide a first voltage to the first electrochromic surface 48 to provide primarily reflectivity from the first electrochromic surface 48.

Each light-generating configuration 38, 40 further comprises a fourth reflective surface 78, a fifth reflective surface 80, and a fourth optic 82, each of which may be at least partially enclosed within the housing 30. A third electrochromic surface 84 is positioned between the light emitting components 44 and the fourth optic 82, to allow control of the light emitted through the fourth optic 82. As with the first and second electrochromic surfaces 48, 50 shown in FIGS. 3-6, the third electrochromic surface 84 may be electrically coupled to at least one power supply. The third electrochromic surface 84 may be configured to provide a light-absorbing state upon application of a second voltage. As a result, light emitted towards the third electrochromic surface 84 from the light emitting components 44 may be primarily, substantially, or completely absorbed, rather than reflected or transmitted, allowing control of the pattern of emitted light. The system 76 further includes one or more walls 62 that separate the light pathways within the system 76.

Figure 8:
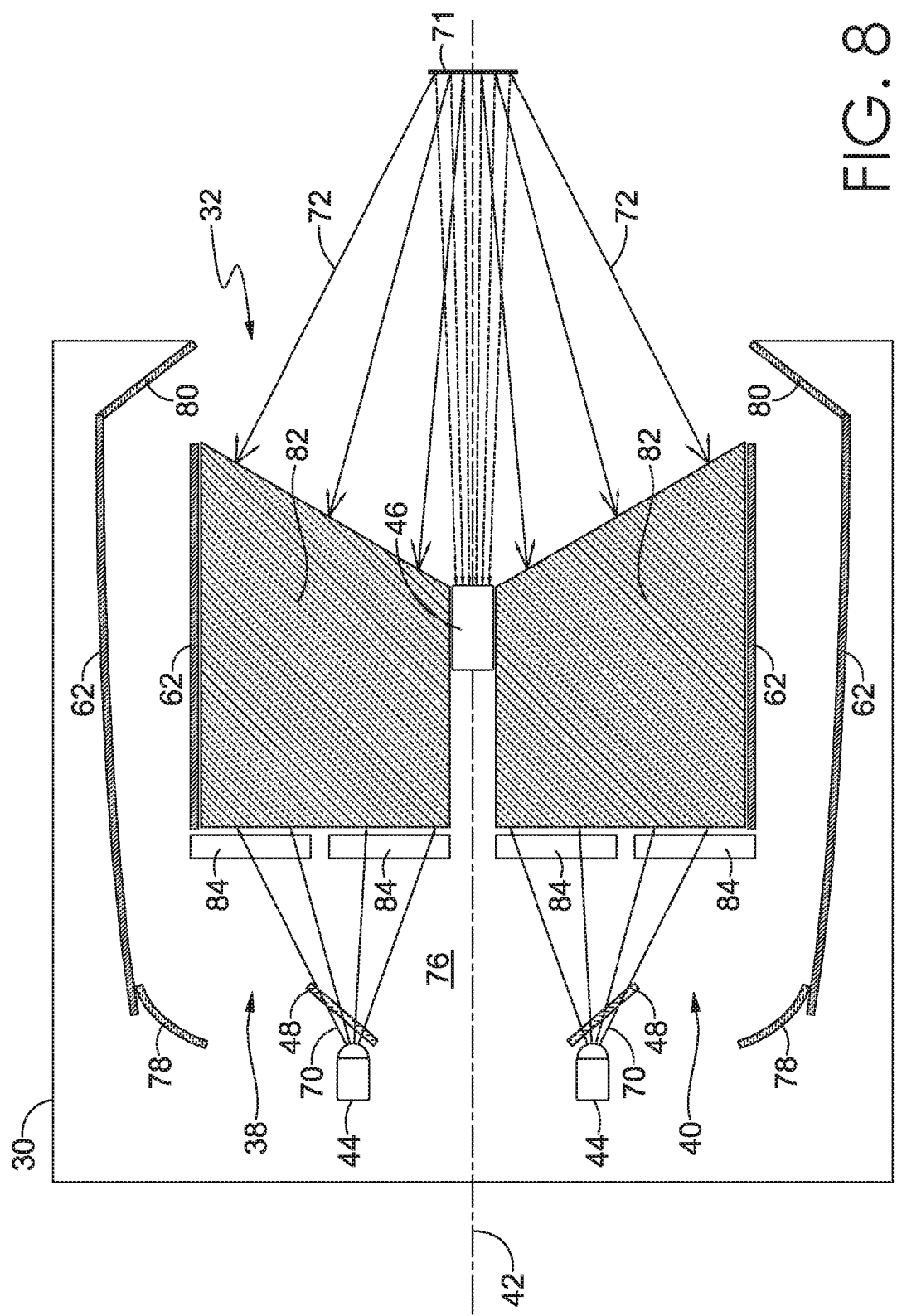
FIG. 8 depicts the system of FIG. 7 emitting a diffuse light pattern, in accordance with an embodiment of the present technology.

Referring to FIG. 8, the system 76 shown in FIG. 7, emitting a diffuse light pattern, is provided, in accordance with an embodiment of the present technology. In FIG. 8, light 70 is emitted from the light emitting components 44 towards the respective first electrochromic surfaces 48. While the light 70 is emitted, the first voltage is reduced or changed to the first electrochromic surfaces 48, so that the first electrochromic surfaces 48 are primarily transmitting, rather than reflective, allowing the light 70 to be transmitted through the first electrochromic surfaces 48. Similarly, while the light 70 is transmitted through the first electrochromic surfaces 48, the second voltage is reduced or changed to the third electrochromic surfaces 84, such that the third electrochromic surfaces 84 are primarily transmitting. Accordingly, the light 70 is transmitted through the third electrochromic surfaces 84 and through the fourth optic 82, producing the diffused light 72. The diffused light 72 is reflected from the scanned surface 71 back towards the receiving optic 46, where it is collected.

Figure 9:
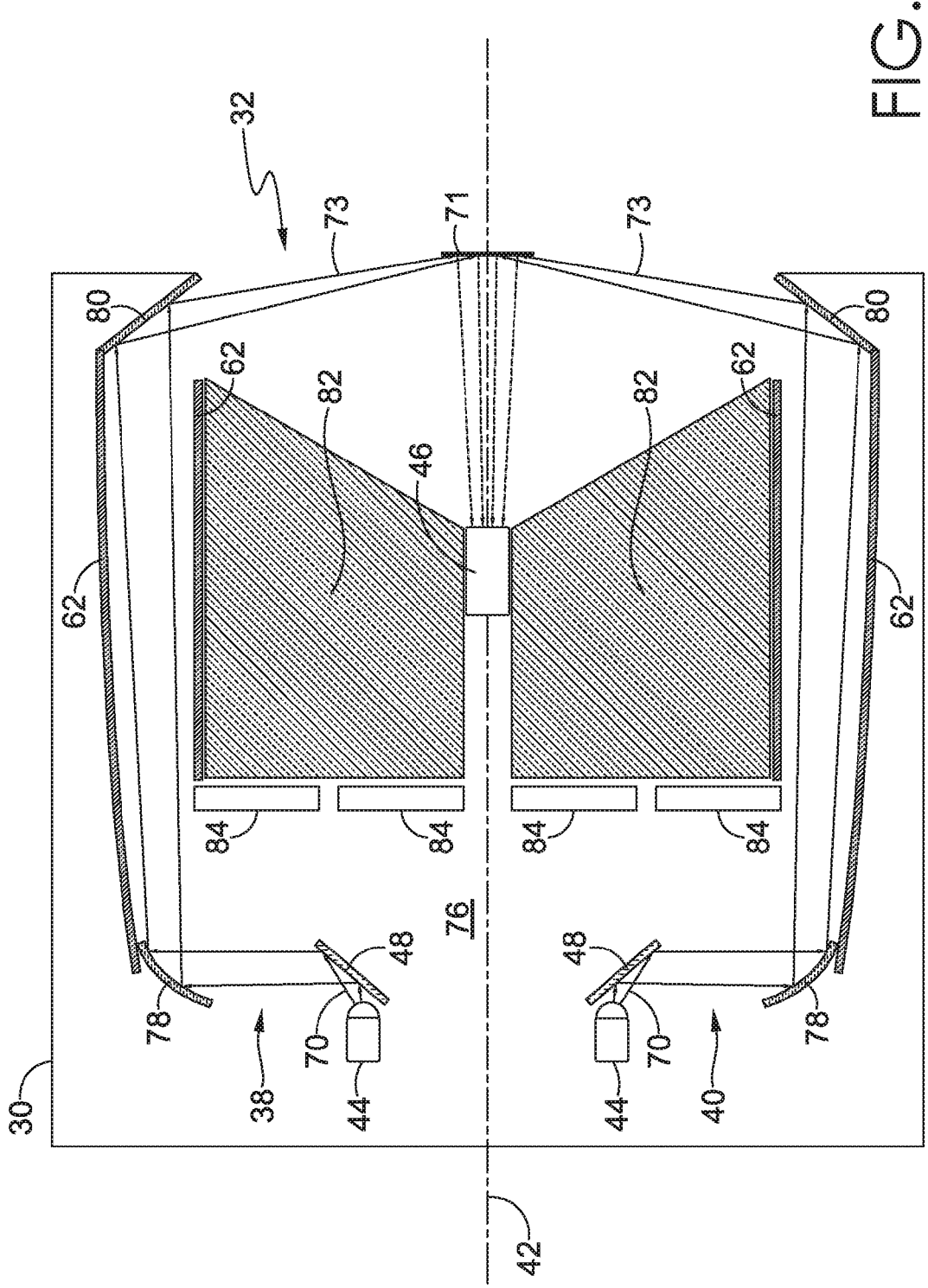
FIG. 9 depicts the system of FIG. 7 emitting a grazing light pattern, in accordance with an embodiment of the present technology.

Referring to FIG. 9, the system 76 of FIG. 7, emitting a grazing light pattern, is provided, in accordance with an embodiment of the present technology. In FIG. 9, the grazing light pattern is generated by emitting the light 70 from the light emitting components 44 towards the first electrochromic surfaces 48 while the first voltage is applied to the first electrochromic surfaces 48, so that the first electrochromic surfaces 48 are primarily reflective, rather than transmitting. As a result, the light 70 is reflected from the first electrochromic surfaces 48 towards the respective fourth reflective surfaces 78, and then reflected towards the respective fifth reflective surfaces 80. The light 70 is subsequently reflected off of the fifth reflective surfaces 80 towards the opening 32 of the housing 30, and emitted as grazing light 73. The grazing light 73 is reflected from the scanned surface 71 back towards the receiving optic 46, where it is collected.

Figure 10:
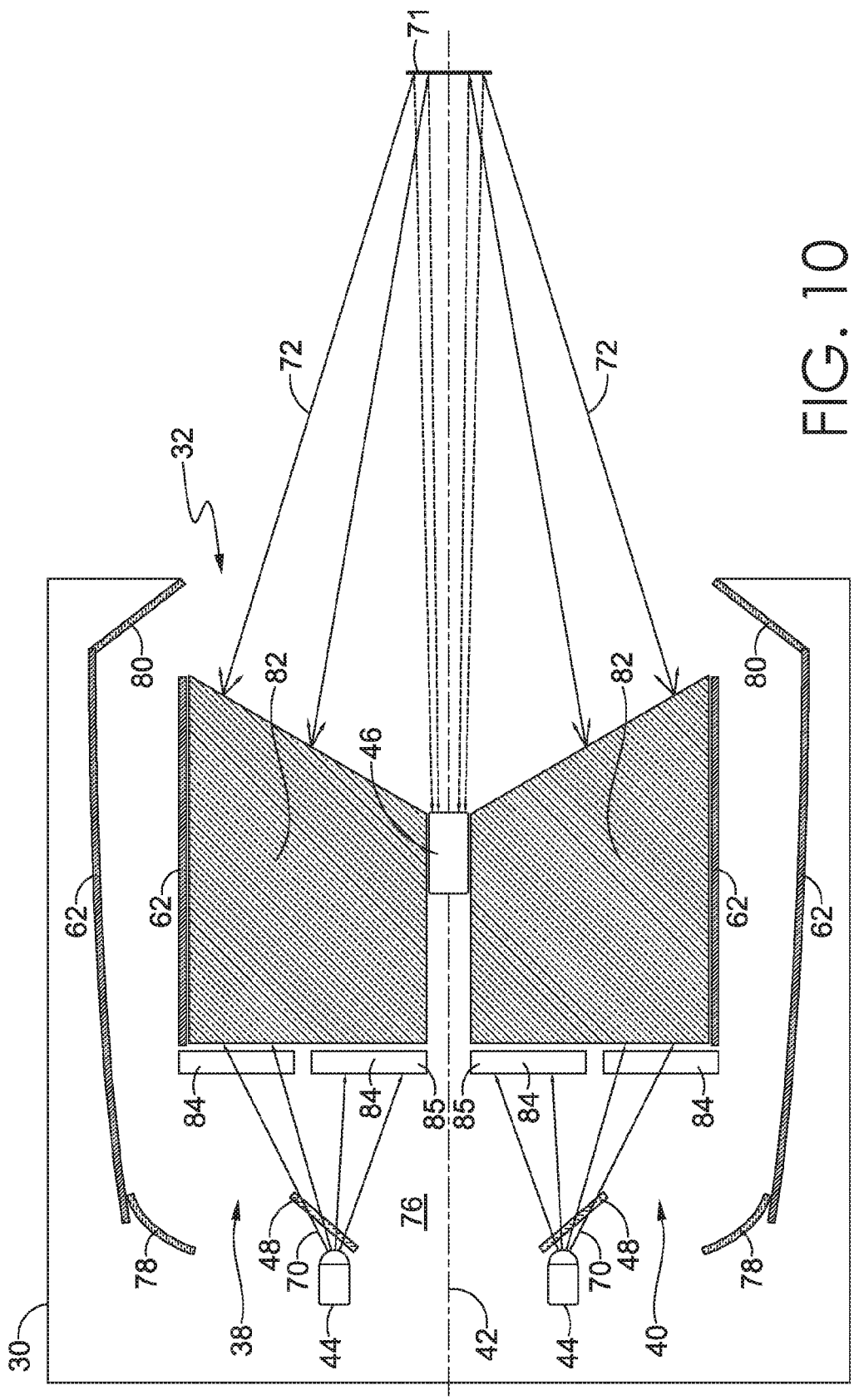
FIG. 10 depicts the system of FIG. 7 emitting a diffuse light pattern, in accordance with an embodiment of the present technology.

Referring to FIG. 10, the system 76 of FIG. 7, emitting a diffuse light pattern, is provided, in accordance with an embodiment of the present technology. In FIG. 10, the diffuse light pattern is generated by emitting the light 70 from the light emitting components 44 towards the first electrochromic surfaces 48 while the first voltage is reduced or changed to the first electrochromic surfaces 48, so that the first electrochromic surfaces 48 are primarily transmitting, rather than reflective. Accordingly, the light 70 is transmitted through the first electrochromic surfaces 48 towards the fourth optic 82. Additionally, at the same time, the second voltage is applied to a portion 85 of the third electrochromic surfaces 84, allowing some of the light 70 to be absorbed by the third electrochromic surfaces 84. This absorption may be used to segment the light 70, or rather, block a portion of the light 70 passing through the fourth optic 82, to provide greater control of the light 70 producing the diffuse light pattern. As a result, diffuse light 72 is emitted from the opening 32 and reflected from the scanned surface 71 back towards the receiving optic 46, where it is collected.

The shape and directionality of the diffuse light 72 may be selectively modified using at least the third electrochromic surface 84 to provide proper reflection from a particular type of scanned surface. For example, the third electrochromic surface 84 may be used to absorb a portion of the light 70 to modify the emitted diffuse light 72, allowing proper reflection from a roughness pattern of a drilled-metal-surface-type of scannable media.

Figure 11:
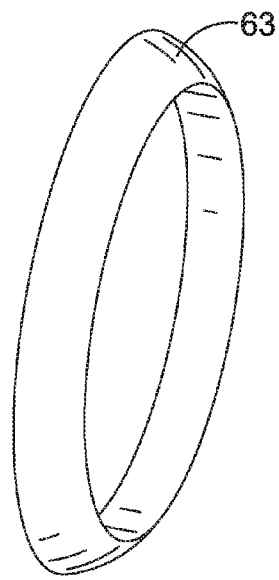
FIG. 11 depicts a refractive optic for use with an illumination system for a scanner, in accordance with an embodiment of the present technology.

Referring to FIG. 11, an exemplary refractive optic 63 which may be used with a scanner is provided, in accordance with an embodiment of the present technology. The refractive optic 63 shown in FIG. 11 may be used to adjust, filter, or otherwise modify light emitted from an illumination system, such as the system 36 shown in FIG. 3, when generating a pattern of light for scanning.

Figure 12A:
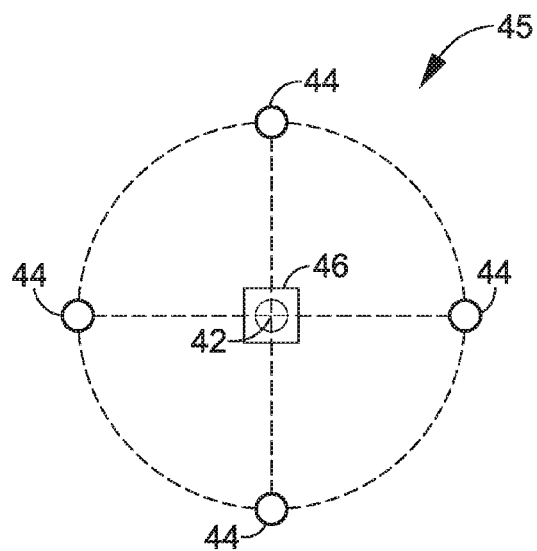
FIGS. 12A and 12B depict cross-section views of an illumination system with components positioned about a receiving optic, in accordance with an embodiment of the present technology.
Figure 12B:
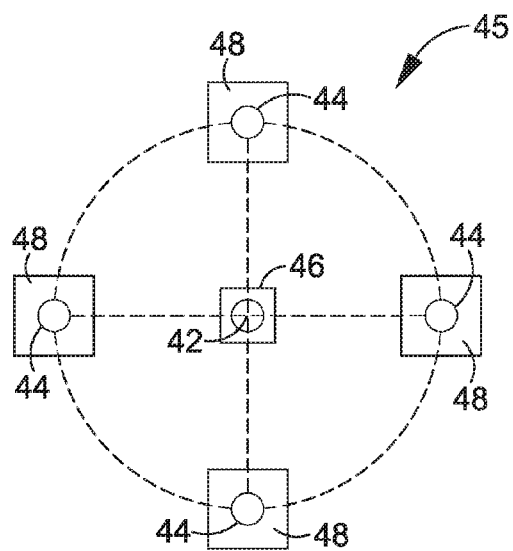

Referring to FIGS. 12A and 12B, cross-sections of an exemplary illumination system 45 for a scanner are provided, in accordance with an embodiment of the present technology. As discussed with respect to the systems 36, 76, light emitting components 44 in the illumination system 45 may be arranged circumferentially about a center axis 42. A receiving optic 46 is located at the center axis 42 to collect reflected light. FIG. 12A depicts four light emitting components 44 positioned circumferentially around the center axis 42 of the system 45, but in other exemplary embodiments, six, eight, ten, or another number of light emitting components 44 may also be positioned circumferentially about the center axis 42 as well, and may be used or activated independently or concurrently to generate patterns of light for scanning. FIG. 12B further depicts each light emitting component 44 being positioned behind a first electrochromic surface 48, which can be used as described to direct light from the light emitting components 44.

Figure 13:
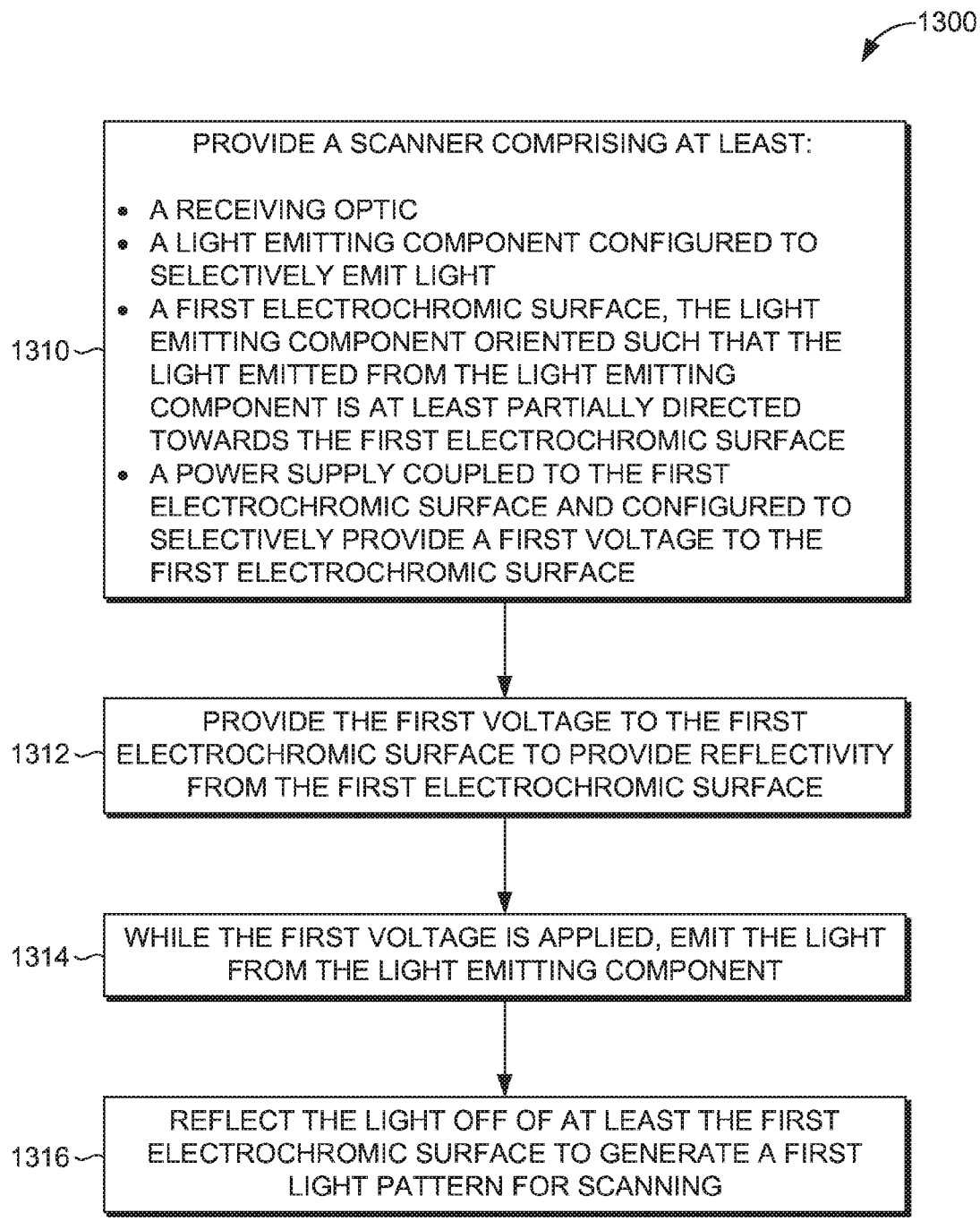
FIG. 13 is a block diagram of an exemplary method of scanning, in accordance with an embodiment of the present technology.

Referring to FIG. 13, a block diagram of an exemplary method 1300 of scanning is provided, in accordance with an embodiment of the present technology. At a block 1310, a scanner, such as the scanner 28 shown in FIG. 2, is provided. The scanner comprises a receiving optic, such as the receiving optic 46 shown in FIG. 3, a light emitting component, such as the light emitting components 44 shown in FIG. 3, configured to selectively emit light, a first electrochromic surface, such as the first electrochromic surfaces 48 shown in FIG. 3, the at least one light emitting component oriented such that the light emitted from the light emitting component is at least partially directed towards the first electrochromic surface, and a power supply coupled to the first electrochromic surface and configured to selectively provide a first voltage to the first electrochromic surface. At a block 1312, the first voltage is provided to the first electrochromic surface to provide reflectivity from the first electrochromic surface. At a block 1314, while the first voltage is applied, the light is emitted from the light emitting component. At a block 1316, the light is reflected off of at least the first electrochromic surface to generate a first light pattern for scanning.

In additional embodiments, the light emitting components 44 may be single wavelength sources or RGB sources. Different light emitting components 44 within a housing 30 may provide different colors and may be activated separately. The scanning systems 36, 76 described herein may be rotatable as well. It should also be noted that the diffuse, grazing, and bright light patterns shown in FIGS. 1-10 are merely exemplary, and additional light patterns with different angles of emittance, pathways within the scanner, and distances to a scanned surface are possible and contemplated.

The present technology has been described in relation to particular embodiments, which are intended in all respects to be illustrative rather than restrictive. Many different arrangements of the various components depicted, as well as use of components not shown, are possible without departing from the spirit and scope of the present disclosure. Alternative aspects will become apparent to those skilled in the art that do not depart from the scope. It will be understood that certain features and subcombinations are of utility and may be employed without reference to other features and subcombinations and are contemplated as within the scope of the claims.

What is claimed is:

1. A scanner, comprising:
   a housing having an opening;
   a receiving optic;
   a light emitting component configured to selectively emit light;
   a first electrochromic surface, the light emitting component oriented such that the light emitted from the light emitting component is at least partially directed towards the first electrochromic surface; and
   a power supply coupled to the first electrochromic surface,
   wherein the receiving optic, the light emitting component, and the first electrochromic surface are at least partially enclosed within the housing, and
   wherein the receiving optic is oriented towards the opening.

2. The scanner of claim 1, wherein the power supply is configured to selectively provide a first voltage to the first electrochromic surface, and wherein the first electrochromic surface is configured to provide:
   a reflectance of the light when the first voltage is applied to the first electrochromic surface and the light is emitted from the light emitting component; and
   a transmittance of the light when the first voltage is changed to the first electrochromic surface and the light is emitted from the light emitting component.

3. The scanner of claim 2, further comprising a first reflective surface enclosed within the housing, the first reflective surface and the first electrochromic surface oriented such that when the first voltage is applied to the first electrochromic surface while the light is emitted from the light emitting component, the light is reflected off of the first electrochromic surface and subsequently off of the first reflective surface.

4. The scanner of claim 3, further comprising a first optic, the first optic oriented such that when the first voltage is applied to the first electrochromic surface while the light is emitted from the light emitting component, the light is reflected off of the first electrochromic surface, reflected off of the first reflective surface, and emitted through the first optic out of the opening of the housing.

5. The scanner of claim 2, further comprising a second electrochromic surface, the first electrochromic surface and the second electrochromic surface aligned along a path of the light emitted from the light emitting component.

6. The scanner of claim 5, wherein the second electrochromic surface is coupled to the power supply, wherein the power supply is configured to selectively provide a second voltage to the second electrochromic surface, and wherein the second electrochromic surface is configured to provide:
   a reflectance of the light when the first voltage is changed to the first electrochromic surface and the second voltage is applied to the second electrochromic surface while the light is emitted from the light emitting component through the first electrochromic surface; and
   a transmittance of the light when the first voltage is changed to the first electrochromic surface and the second voltage is changed to the second electrochromic surface while the light is emitted from the light emitting component through the first electrochromic surface.

7. The scanner of claim 6, further comprising a second reflective surface, the second reflective surface oriented such that when the light is emitted from the light emitting component and transmitted through the first electrochromic surface while the first voltage is changed, and transmitted through the second electrochromic surface while the second voltage is changed, the light is reflected off of at least the second reflective surface and out of the opening of the housing.

8. The scanner of claim 7, further comprising a third reflective surface, the third reflective surface oriented such that when the light is emitted from the light emitting component while the first voltage is changed to the first electrochromic surface and while the second voltage is applied to the second electrochromic surface, the light is transmitted through the first electrochromic surface, is reflected off of the second electrochromic surface, and is reflected off of the third reflective surface.

9. The scanner of claim 8, further comprising a refractive optic at the opening of the housing through which the light reflected from the third reflective surface passes.

10. The scanner of claim 1, wherein the power supply is configured to selectively provide a first voltage to the first electrochromic surface, and wherein the first electrochromic surface is configured to provide:
   an absorption of at least a portion of the light when the first voltage is applied to the first electrochromic surface and the light is emitted from the light emitting component; and
   a transmittance of the light when the first voltage is changed to the first electrochromic surface and the light is emitted from the light emitting component.

11. A scanner configured to provide variable illumination, the scanner comprising:
   a housing having an opening, the housing having enclosed at least partially therein:
       a receiving optic oriented towards the opening,
       a plurality of light emitting components configured to selectively emit light,
       a first plurality of electrochromic surfaces, each electrochromic surface of the first plurality of electrochromic surfaces oriented to receive at least a portion of the light from a respective light emitting component of the plurality of light emitting components; and
   at least one power supply coupled to the plurality of light emitting components and to the first plurality of electrochromic surfaces.

12. The scanner of claim 11, the housing further comprising at least partially therein a first plurality of reflective surfaces oriented such that when a first voltage is applied to the first plurality of electrochromic surfaces while the light is emitted, the light is reflected off of the respective first plurality of electrochromic surfaces and subsequently is reflected off of the respective first plurality of reflective surfaces towards an opening of the housing.

13. The scanner of claim 12, the housing further comprising at least partially therein a second plurality of electrochromic surfaces coupled to the at least one power supply, each electrochromic surface of the first plurality of electrochromic surfaces aligned with a respective electrochromic surface of the second plurality of electrochromic surfaces along a respective path of light from one of the plurality of light emitting components.

14. The scanner of claim 13, the housing further comprising at least partially therein a second plurality of reflective surfaces oriented such that while the first voltage is changed to the first plurality of electrochromic surfaces and while a second voltage is applied to the second plurality of electrochromic surfaces, and while the light is emitted from the respective light emitting components, the light is transmitted through the respective first plurality of electrochromic surfaces and reflected off of the respective second plurality of electrochromic surfaces towards the respective second plurality of reflective surfaces, where the light is reflected towards the opening of the housing.

15. A scanning method, comprising:
   providing a scanner comprising at least:
       a housing having an opening;
       a receiving optic oriented towards the opening,
       a light emitting component configured to selectively emit light,
       a first electrochromic surface, the light emitting component oriented such that the light emitted from the light emitting component is at least partially directed towards the first electrochromic surface, and
       a power supply coupled to the first electrochromic surface and configured to selectively provide a first voltage to the first electrochromic surface,
       wherein the receiving optic, the light emitting component, and the first electrochromic surface are at least partially enclosed within the housing;
   providing the first voltage to the first electrochromic surface to provide reflectivity from the first electrochromic surface;
   while the first voltage is applied, emitting the light from the light emitting component; and
   reflecting the light off of at least the first electrochromic surface to generate a first light pattern for scanning.

16. The method of claim 15, further comprising changing the first voltage to the first electrochromic surface and, while the first voltage is changed to the first electrochromic surface, emitting the light from the light emitting component through at least the first electrochromic surface to generate a second light pattern for scanning.

17. The method of claim 15, further comprising transmitting the light reflected off of the first electrochromic surface through one or more transmitting surfaces.

18. The method of claim 15, further comprising reflecting the light reflected off of the first electrochromic surface off of one or more reflective surfaces.

19. The method of claim 15, wherein the scanner further comprises a second electrochromic surface positioned along a path of the light emitted from the light emitting component, and wherein the method further comprises providing a second voltage to the second electrochromic surface while the first voltage is changed to the first electrochromic surface, and, while the first voltage is changed and the second voltage is applied, emitting the light from the light emitting component such that it passes through the first electrochromic surface and is reflected off of at least the second electrochromic surface to generate a third light pattern for scanning.

20. The method of claim 19, further comprising reflecting the light reflected from the second electrochromic surface off of one or more reflective surfaces prior to generating the third light pattern for scanning.

\* \* \* \* \*